United States Patent
Basso et al.

(10) Patent No.: US 8,989,005 B2
(45) Date of Patent: *Mar. 24, 2015

(54) MONITORING ENDPOINT BUFFER OCCUPANCY TO DETERMINE CONGESTION IN AN ETHERNET NETWORK

(71) Applicant: Lenovo Enterprise Solutions (Singapore) Pte. Ltd., Singapore (SG)

(72) Inventors: Claude Basso, Nice (FR); Rolf Clauberg, Gattikon (CH); Casimer M. DeCusatis, Poughkeepsie, NY (US); Mircea Gusat, Langnau (CH); Ronald P. Luijten, Thalwil (CH); Fredy D. Neeser, Langnau am Albis (CH); Kenneth M. Valk, Rochester, MN (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 173 days.

This patent is subject to a terminal disclaimer.

(21) Appl. No.: 13/708,934

(22) Filed: Dec. 8, 2012

(65) Prior Publication Data

US 2013/0194946 A1    Aug. 1, 2013

Related U.S. Application Data

(63) Continuation of application No. 13/360,679, filed on Jan. 28, 2012.

(51) Int. Cl.
*H04L 12/26* (2006.01)
*H04L 12/835* (2013.01)
*H04L 12/875* (2013.01)

(52) U.S. Cl.
CPC ............... *H04L 43/00* (2013.01); *H04L 43/08* (2013.01); *H04L 47/56* (2013.01); *H04L 47/30* (2013.01)

USPC .......................................................... 370/232

(58) Field of Classification Search
None
See application file for complete search history.

(56) References Cited

U.S. PATENT DOCUMENTS

| | | | |
|---|---|---|---|
| 6,628,613 B1 | 9/2003 | Joung | H04L 12/56 |
| 6,717,912 B1 | 4/2004 | Lemyre | H04L 12/56 |
| 6,882,624 B1 * | 4/2005 | Ma | 370/236.1 |
| 2002/0136163 A1 | 9/2002 | Kawakami et al. | H04L 12/56 |

(Continued)

FOREIGN PATENT DOCUMENTS

| | | | |
|---|---|---|---|
| CN | 101459966 A | 6/2009 | H04W 72/12 |
| CN | 102196502 A | 9/2011 | H04W 28/10 |

(Continued)

OTHER PUBLICATIONS

International Search Report and Written Opinion for PCT/IB2013/050272, pp. 1-11 (May 30, 2013).

*Primary Examiner* — Yemane Mesfin
*Assistant Examiner* — Peter Chen
(74) *Attorney, Agent, or Firm* — Katherine S. Brown; Jeffrey L. Streets (57) ABSTRACT

A system to improve a Converged Enhanced Ethernet network may include a controller having a computer processor connected to a layer 2 endpoint buffer. The system may also include a manager executing on the controller to monitor the layer 2 endpoint buffer by determining buffer data packet occupancy and/or rate of change in the buffer data packet occupancy. The system may further include a reporter to notify a congestion source of the layer 2 endpoint buffer based upon the buffer data packet occupancy and/or rate of change in the buffer data packet occupancy.

5 Claims, 8 Drawing Sheets

(56) References Cited

U.S. PATENT DOCUMENTS

| | | | |
|---|---|---|---|
| 2005/0180320 A1* | 8/2005 | Yeh | 370/229 |
| 2011/0205899 A1* | 8/2011 | Hosein | 370/235 |
| 2012/0063493 A1* | 3/2012 | Hasegawa et al. | 375/211 |
| 2012/0155256 A1* | 6/2012 | Pope et al. | 370/230 |

FOREIGN PATENT DOCUMENTS

| | | | |
|---|---|---|---|
| WO | WO2007050250 | 5/2007 | .............. H04L 12/26 |
| WO | WO 2010/100837 A1 * | 9/2010 | |

* cited by examiner

FIG. 8

MONITORING ENDPOINT BUFFER OCCUPANCY TO DETERMINE CONGESTION IN AN ETHERNET NETWORK

CROSS-REFERENCE TO RELATED APPLICATIONS

This is a Continuation Application to U.S. patent application Ser. No. 13/360,679 entitled "AN IMPROVED CONVERGED ENHANCED ETHERNET NETWORK", filed Jan. 28, 2012, which application is incorporated herein by reference.

BACKGROUND

The disclosure relates to the field of computer networking, and, more particularly, to Ethernet networks.

Long distance connectivity across metropolitan area fiber optic networks is typically based on Generic Frame Procedure (GFP) protocols. Data transmission across metropolitan area distances (100-300 kilometers) is described in the International Telecommunications Union (ITU) document G.7041 and is called GFP. CEE uses 64/66B encoding for transmission over long distance.

SUMMARY

According to one embodiment, a system to improve a Converged Enhanced Ethernet network may include a controller having a computer processor connected to a layer 2 endpoint buffer. The system may also include a manager executing on the controller to monitor the layer 2 endpoint buffer by determining buffer data packet occupancy and/or rate of change in the buffer data packet occupancy. The system may further include a reporter to notify a congestion source of the layer 2 endpoint buffer based upon the buffer data packet occupancy and/or rate of change in the buffer data packet occupancy.

The layer 2 endpoint buffer may comprise a layer 2 transmitter buffer and/or a layer 2 receiver buffer. The layer 2 endpoint buffer may provide frame segmentation and/or frame retransmission.

The buffer data packet occupancy may consider un-transmitted data packets, unordered data packets, and/or data unacknowledged packets. The layer 2 endpoint buffer may include reliable transport functionality.

The reporter may send congestion notification to the congestion source. The layer 2 endpoint buffer may receive data packets from a plurality of sources.

The manager may use unsent and/or unacknowledged frames in relation to the round-trip-time*bandwidth product at the layer 2 transmitter buffer as an indication of delay spread and/or congestion in the Converged Enhanced Ethernet network. The manager may use many partially reassembled frames and/or fully reassembled but undelivered frames at the layer 2 receiver buffer as an indication of delay spread and/or congestion in the Converged Enhanced Ethernet network.

Another aspect is a method to improve a Converged Enhanced Ethernet network. The method may include monitoring a layer 2 endpoint buffer by determining buffer data packet occupancy and/or rate of change in the buffer data packet occupancy, via a manager executing on a controller in a Converged Enhanced Ethernet network that includes a computer processor. The method may also include notifying through a reporter a congestion source of the layer 2 endpoint buffer based upon the buffer data packet occupancy and/or rate of change in the buffer data packet occupancy.

The method may further include providing frame segmentation and/or frame retransmission through the layer 2 endpoint buffer. The method may additionally include considering un-transmitted data packets, unordered data packets, and/or data unacknowledged packets with the buffer data packet occupancy. The method also includes sending congestion notification to the congestion source through the reporter.

The method may further include using at the manager unsent and/or unacknowledged frames in relation to the round-trip-time*bandwidth product at a layer 2 transmitter buffer that is part of the layer 2 endpoint buffer as an indication of delay spread and/or congestion in the Converged Enhanced Ethernet network. The method may additionally include using at the manager many partially reassembled frames and/or fully reassembled but undelivered frames at the layer 2 receiver buffer that is part of the layer 2 endpoint buffer as an indication of delay spread and/or congestion in the Converged Enhanced Ethernet network.

Another aspect is a computer readable program codes coupled to tangible media to improve a Converged Enhanced Ethernet network. The computer readable program codes may be configured to cause the program to monitor a layer 2 endpoint buffer by determining buffer data packet occupancy and/or rate of change in the buffer data packet occupancy, via a manager executing on a controller in a Converged Enhanced Ethernet network that includes a computer processor. The computer readable program codes may also notify through a reporter a congestion source of the layer 2 endpoint buffer based upon the buffer data packet occupancy and/or rate of change in the buffer data packet occupancy.

The computer readable program codes may further provide frame segmentation and/or frame retransmission through the layer 2 endpoint buffer. The computer readable program codes may additionally consider un-transmitted data packets, unordered data packets, and/or data unacknowledged packets with the buffer data packet occupancy. The computer readable program codes may also send congestion notification to the congestion source through the reporter.

The computer readable program codes may further use at the manager unsent and/or unacknowledged frames, in relation to the round-trip-time*bandwidth product at a layer 2 transmitter buffer that is part of the layer 2 endpoint buffer as an indication of delay spread and/or congestion in the Converged Enhanced Ethernet network. The computer readable program codes may additionally use at the manager many partially reassembled frames and/or fully reassembled but undelivered frames at the layer 2 receiver buffer that is part of the layer 2 endpoint buffer as an indication of delay spread and/or congestion in the Converged Enhanced Ethernet network.

DETAILED DESCRIPTION

The invention will now be described more fully hereinafter with reference to the accompanying drawings, in which preferred embodiments of the invention are shown. Like numbers refer to like elements throughout.

Figure 1:
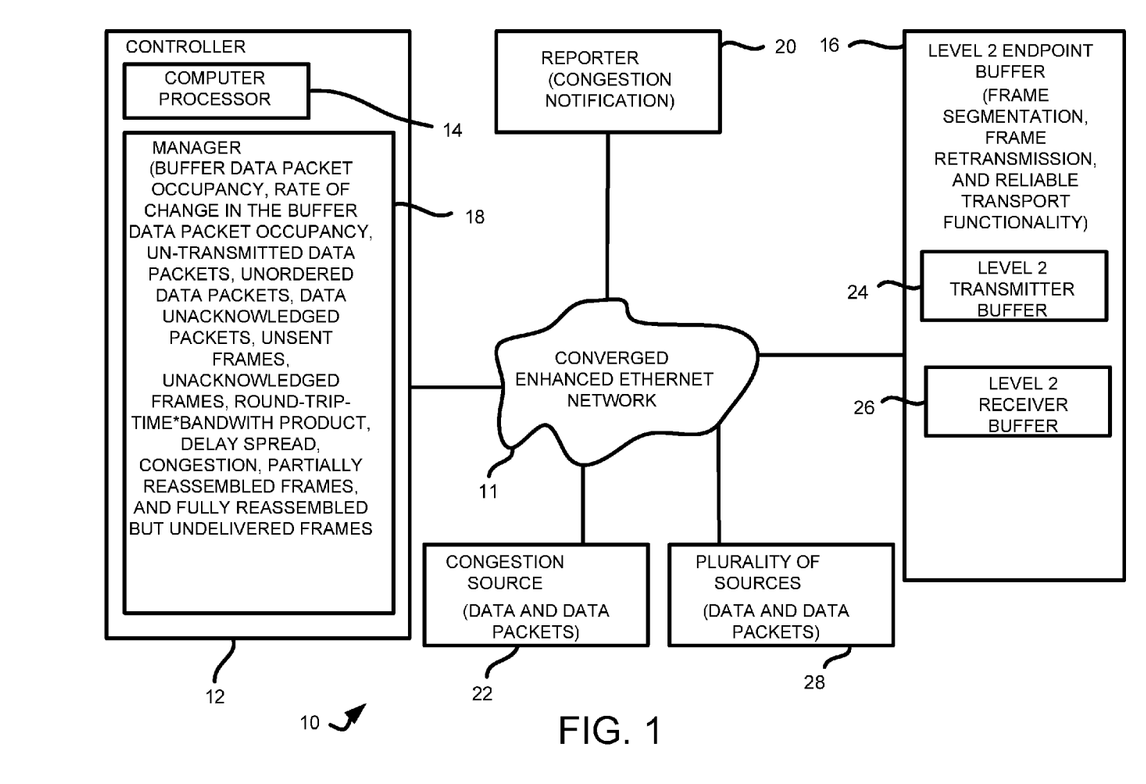
FIG. 1 is a block diagram illustrating a Converged Enhanced network in accordance with the invention.

With reference now to FIG. 1, a system 10 to improve a Converged Enhanced Ethernet network 11 is initially described. In an embodiment, system 10 includes a controller 12 comprising a computer processor 14 connected to a layer 2 endpoint buffer 16. The system 10 also includes a manager 18 executing on the controller 12 to monitor the layer 2 endpoint buffer 16 by determining buffer data packet occupancy and/or rate of change in the buffer data packet occupancy. The system 10 further includes a reporter 20 to notify a congestion source 22 of the layer 2 endpoint buffer 16 based upon the buffer data packet occupancy and/or rate of change in the buffer data packet occupancy.

In one embodiment, the layer 2 endpoint buffer 16 comprises a layer 2 transmitter buffer 24 and/or a layer 2 receiver buffer 26. In another embodiment, the layer 2 endpoint buffer 16 provides frame segmentation and/or frame retransmission.

In one embodiment, the buffer data packet occupancy considers un-transmitted data packets, unordered data packets, and/or data unacknowledged packets. In another embodiment, the layer 2 endpoint buffer 16 includes reliable transport functionality.

In one embodiment, the reporter 20 sends congestion notification to the congestion source 22. In another embodiment, the layer 2 endpoint buffer 16 receives data packets from a plurality of sources 28. Anyone of the plurality of sources 28 and/or any number of the plurality of sources 28 can also be the congestion source 22.

In one embodiment, the manager 18 uses unsent and/or unacknowledged frames in relation to the round-trip-time*bandwidth product at the layer 2 transmitter buffer 24 as an indication of delay spread and/or congestion in the Converged Enhanced Ethernet network 11. In another embodiment, the manager 18 uses many partially reassembled frames and/or fully reassembled but undelivered frames at the layer 2 receiver buffer 26 as an indication of delay spread and/or congestion in the Converged Enhanced Ethernet network 11.

Figure 2:
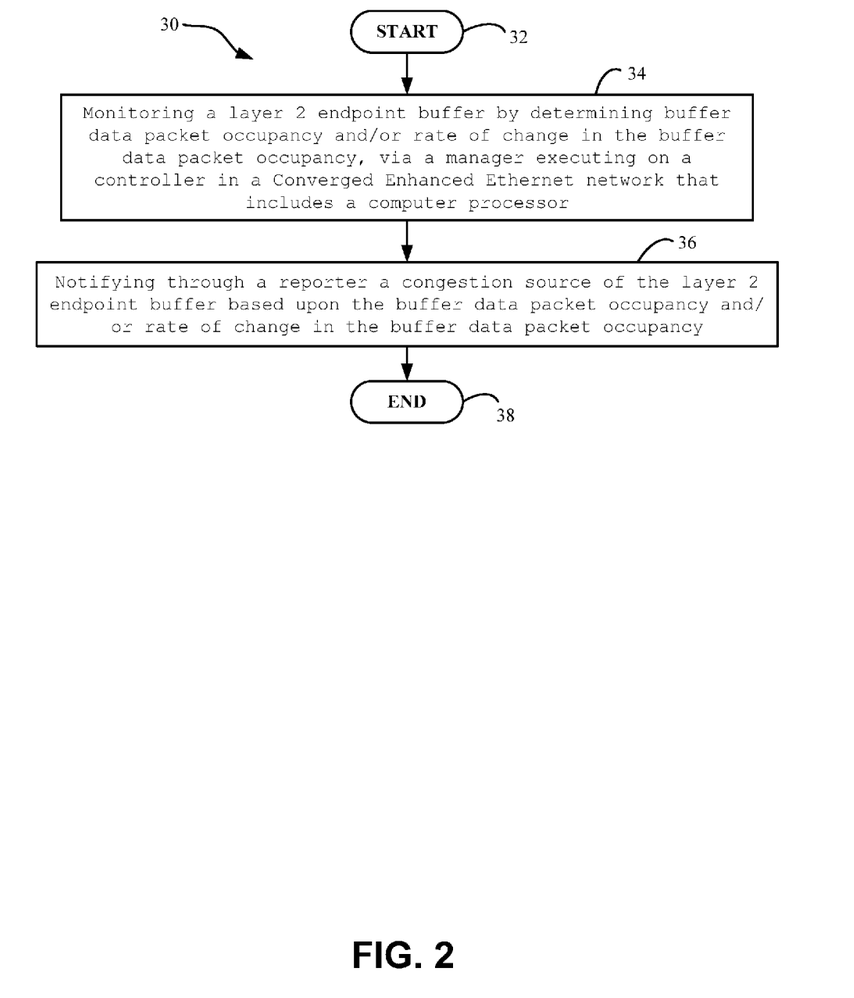
FIG. 2 is a flowchart illustrating method aspects according to the invention.

Another aspect is a method to improve a Converged Enhanced Ethernet network, which is now described with reference to flowchart 30 of FIG. 2. The method begins at Block 32 and may include monitoring a layer 2 endpoint buffer by determining buffer data packet occupancy and/or rate of change in the buffer data packet occupancy, via a manager executing on a controller in a Converged Enhanced Ethernet network that includes a computer processor at Block 34. The method may also include notifying through a reporter a congestion source of the layer 2 endpoint buffer based upon the buffer data packet occupancy and/or rate of change in the buffer data packet occupancy at Block 36. The method ends at Block 38.

Figure 3:
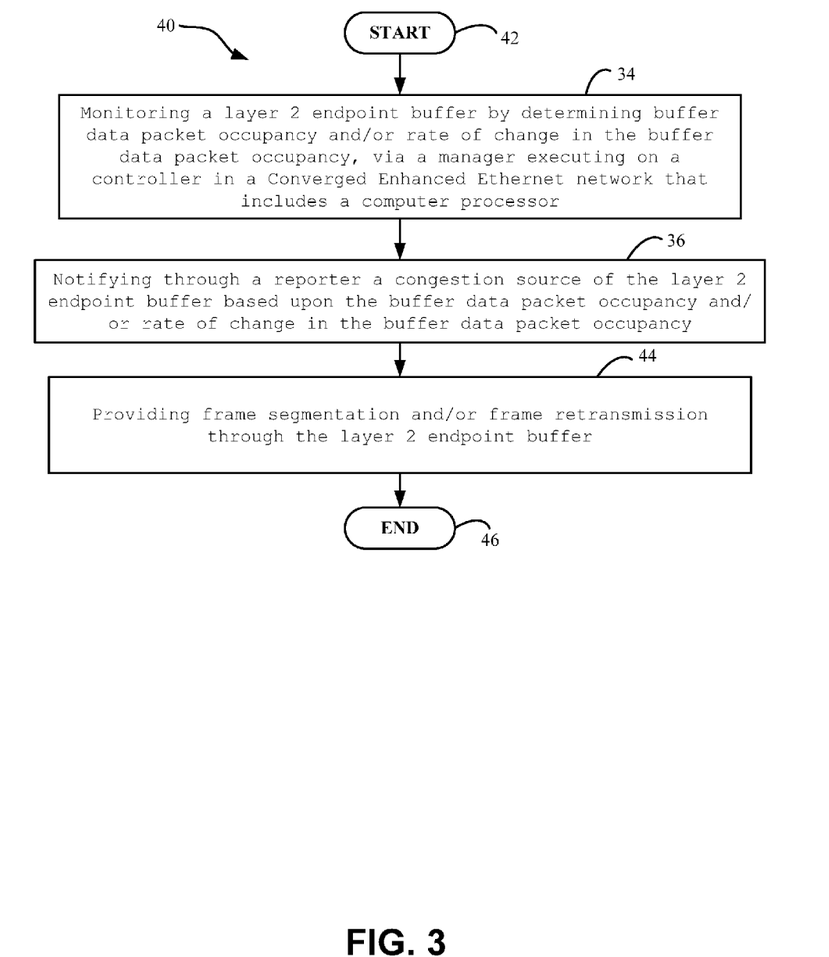
FIG. 3 is a flowchart illustrating method aspects according to the method of FIG. 2.

In another method embodiment, which is now described with reference to flowchart 40 of FIG. 3, the method begins at Block 42. The method may include the steps of FIG. 2 at Blocks 34 and 36. The method may further include providing frame segmentation and/or frame retransmission through the layer 2 endpoint buffer at Block 44. The method ends at Block 46.

Figure 4:
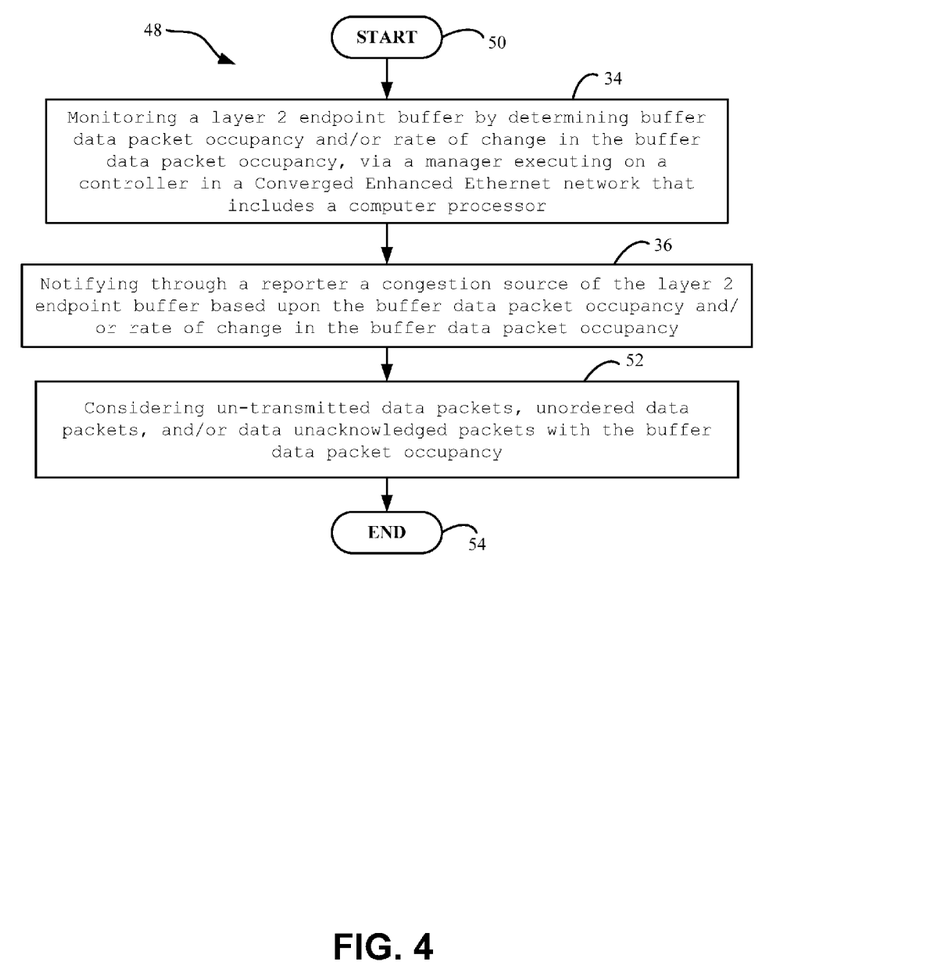
FIG. 4 is a flowchart illustrating method aspects according to the method of FIG. 2.

In another method embodiment, which is now described with reference to flowchart 48 of FIG. 4, the method begins at Block 50. The method may include the steps of FIG. 2 at Blocks 34 and 36. The method may additionally include considering un-transmitted data packets, unordered data packets, and/or data unacknowledged packets with the buffer data packet occupancy at Block 52. The method ends at Block 54.

Figure 5:
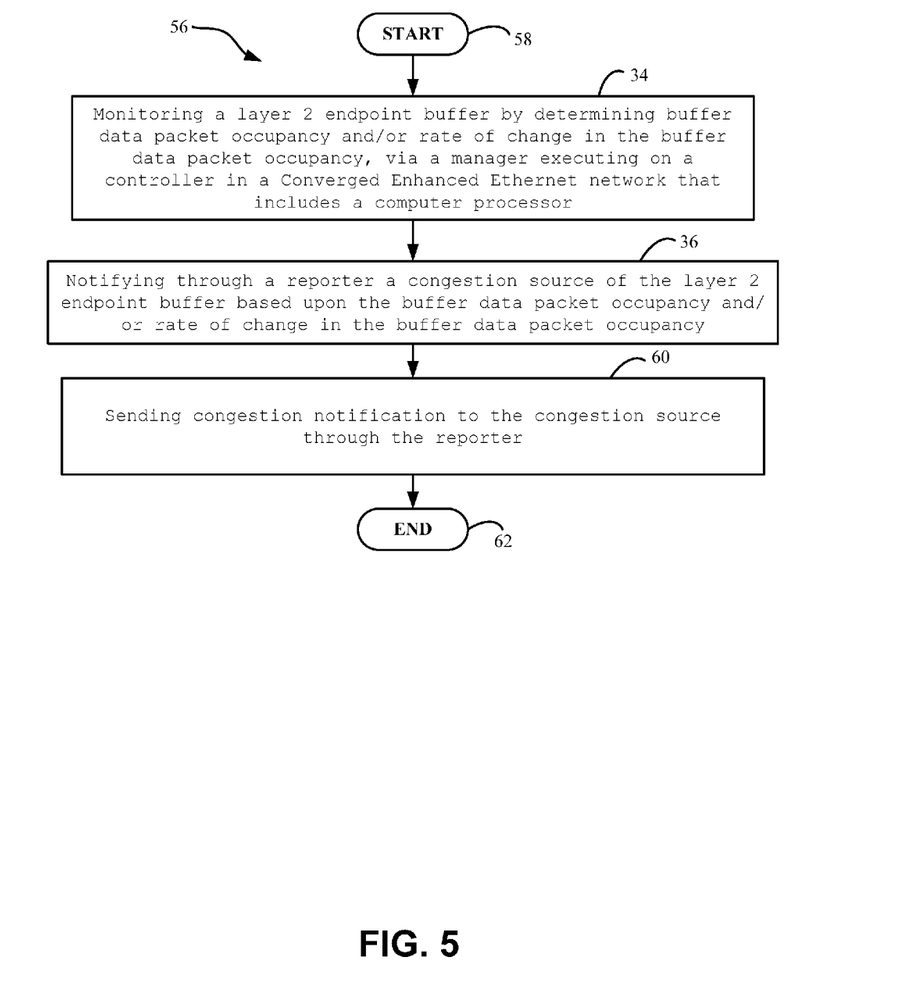
FIG. 5 is a flowchart illustrating method aspects according to the method of FIG. 2.

In another method embodiment, which is now described with reference to flowchart 56 of FIG. 5, the method begins at Block 58. The method may include the steps of FIG. 2 at Blocks 34 and 36. The method also includes sending congestion notification to the congestion source through the reporter at Block 60. The method ends at Block 62.

Figure 6:
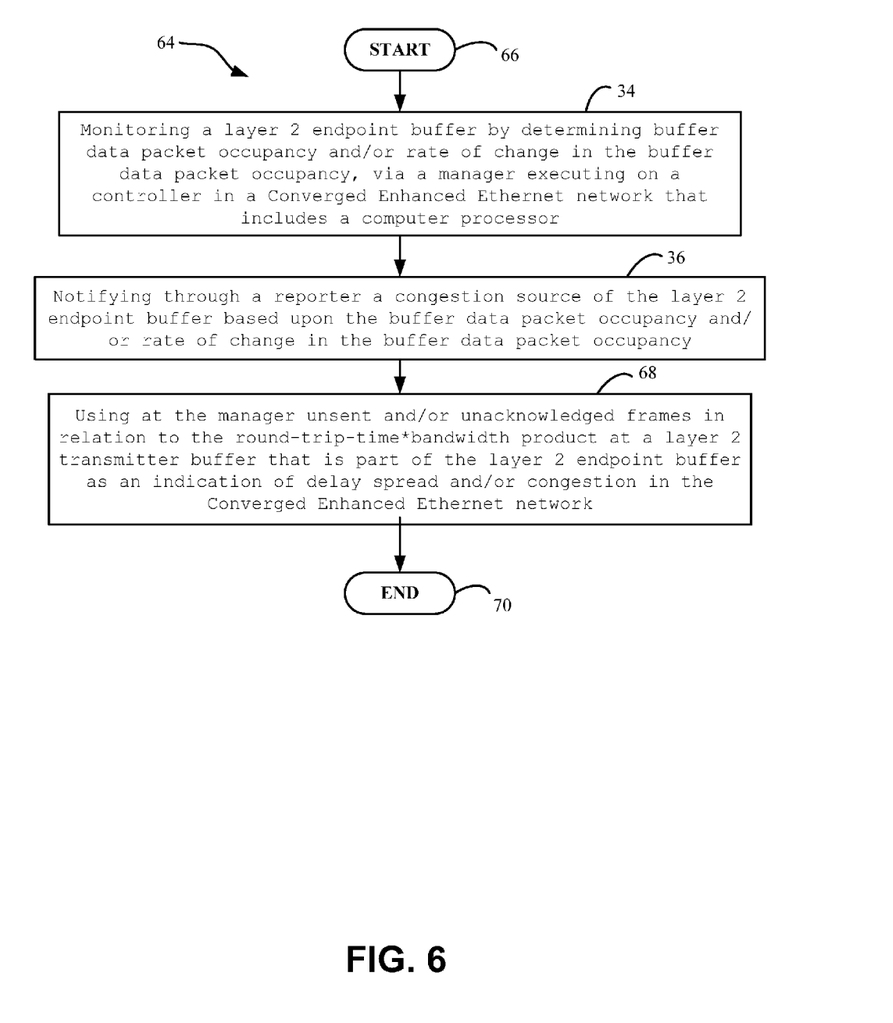
FIG. 6 is a flowchart illustrating method aspects according to the method of FIG. 2.

In another method embodiment, which is now described with reference to flowchart 64 of FIG. 6, the method begins at Block 66. The method may include the steps of FIG. 2 at Blocks 34 and 36. The method may further include using at the manager unsent and/or unacknowledged frames in relation to the round-trip-time*bandwidth product at a layer 2 transmitter buffer that is part of the layer 2 endpoint buffer as an indication of delay spread and/or congestion in the Converged Enhanced Ethernet network at Block 68. The method ends at Block 70.

Figure 7:
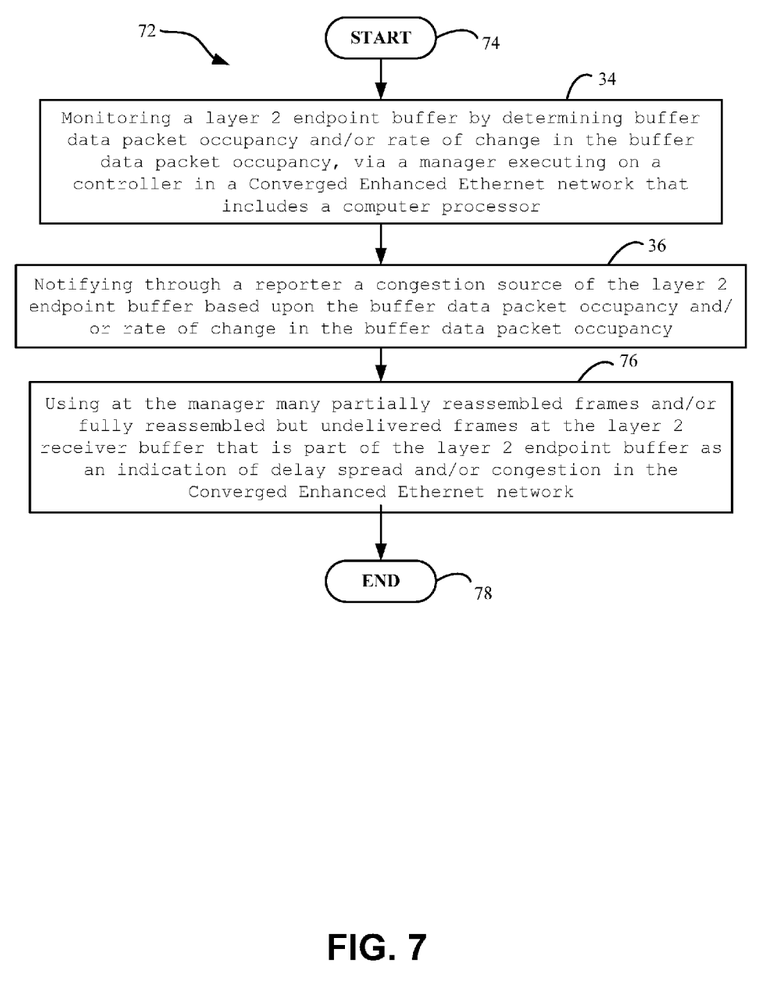
FIG. 7 is a flowchart illustrating method aspects according to the method of FIG. 2.

In another method embodiment, which is now described with reference to flowchart 72 of FIG. 7, the method begins at Block 74. The method may include the steps of FIG. 2 at Blocks 34 and 36. The method may additionally include using at the manager many partially reassembled frames and/or fully reassembled but undelivered frames at the layer 2 receiver buffer that is part of the layer 2 endpoint buffer as an indication of delay spread and/or congestion in the Converged Enhanced Ethernet network at Block 76. The method ends at Block 78.

Another aspect is a computer readable program codes coupled to tangible media to improve a Converged Enhanced Ethernet network 11. The computer readable program codes may be configured to cause the program to monitor a layer 2 endpoint buffer 16 by determining buffer data packet occupancy and/or rate of change in the buffer data packet occupancy, via a manager 18 executing on a controller 12 in a Converged Enhanced Ethernet network 11 that includes a computer processor 14. The computer readable program codes may also notify through a reporter 20 a congestion source 22 of the layer 2 endpoint buffer 16 based upon the buffer data packet occupancy and/or rate of change in the buffer data packet occupancy.

The computer readable program codes may further provide frame segmentation and/or frame retransmission through the layer 2 endpoint buffer 16. The computer readable program codes may additionally consider un-transmitted data packets, unordered data packets, and/or data unacknowledged packets with the buffer data packet occupancy. The computer readable program codes may also send congestion notification to the congestion source 22 through the reporter 20.

The computer readable program codes may further use at the manager 18 unsent and/or unacknowledged frames, in relation to the round-trip-time*bandwidth product at a layer 2 transmitter buffer 24 that is part of the layer 2 endpoint buffer 16 as an indication of delay spread and/or congestion in the Converged Enhanced Ethernet network 11. The computer readable program codes may additionally use at the manager 18 many partially reassembled frames and/or fully reassembled but undelivered frames at the layer 2 receiver buffer 26 that is part of the layer 2 endpoint buffer 16 as an indication of delay spread and/or congestion in the Converged Enhanced Ethernet network 11.

In view of the foregoing, the system 10 improves a Converged Enhanced Ethernet network. For example, system 10 provides hardware/software for providing a low-latency, reliable end-to-end transport on layer 2 (L2) supporting Converged Enhanced Ethernet (CEE). Layer 2 refers to the data link layer of the Open Systems Interconnection model (OSI model) as will be appreciated by those of skill in the art.

Such an L2 transport uses on its two "endpoints" a transmit (TX) buffer for staging, segmentation and retransmission of Ethernet frames, and a receive (RX) buffer for re-sequencing out-of-order packets, reassembly of frames, and forwarding reassembled frames to upper layers.

These TX and RX buffers at the edges of the L2 interconnection network may accommodate hundreds of simultaneous flows from different traffic sources competing for bandwidth. Concerned mostly with "connections" and resource arbitration among L2 transport endpoints, the L2 transport can at best differentiate traffic into priority groups, but is unaware of distinct traffic sources in hosts, operating systems (OSes) and guest OSes, as well as in different upper-layer protocols. As a result, one traffic source can easily "hog" an L2 TX and/or RX buffer, leading to an unfair and latency-increasing buffer usage. Moreover, multiple traffic sources may jointly overwhelm an L2 transport endpoint.

Applicants note that the TX and RX buffers at the transport endpoints accumulate or integrate traffic from many sources. In networks with low probability of packet loss, a TX buffer containing many unsent or unacknowledged frames (in relation to the RTT*bandwidth product) indicates delay spread and/or congestion in the network. Likewise, an RX buffer containing many partially reassembled frames or fully reassembled but undelivered frames indicates delay spread and/or congestion in the network.

System 10 therefore reuses the TX buffer 24 and RX buffers 26 of the L2 transport for congestion detection and for triggering the generation of congestion notification messages (CNMs) according to /EEE 802.1Qau, which resolves distinct traffic sources in the CNM feedback messages and leads to a fair usage of shared TX and RX buffer resources at L2 transport endpoints via smooth traffic source rate adjustments as opposed to on/off operation.

For instance, in a Converged Enhanced Ethernet datacenter network, a method for detecting congestion at the edges of the network in endpoints with Layer 2 reliable transport functionality may include detecting congestion in an endpoint transmission buffer that is used for frame segmentation and retransmission by determining the extent of buffer occupancy of packets (due to un-transmitted as well as unordered and unacknowledged packets) and the rate of change of the buffer occupancy using a transmission buffer congestion detector. The method may also include detecting congestion in an endpoint receive buffer that is used for re-sequencing packets, frame reassembly, and frame forwarding by determining the buffer occupancy of packets (due to partially reassembled frames or fully reassembled but undelivered frames) and the rate of change of the buffer occupancy using a receive buffer congestion detector. The method may further include sending congestion notification messages to sources that produced the congestion when congestion is detected in either the transmission buffer or the receive buffer. As a result, the system 10 provides double-use buffering for end-to-end data transport and congestion management.

It is noted that Converged Enhanced Ethernet (CEE) datacenters allow high link speeds and short delays while introducing lossless operation (and lossless traffic classes) beyond the traditional lossy operation (lossy traffic classes). In order to ensure lossless operation on layer 2 (L2) Ethernet with its inherent end-to-end latency advantage, hardware interconnects typically provide a L2 retransmission (RTX) mechanism. To ensure low end-to-end delays for latency-sensitive applications, possibly taking advantage of multipath, and to facilitate priority-based scheduling, Ethernet frames are advantageously segmented into shorter packets at a source endpoint, and these packets need to be resequenced (RSQ) and reassembled at a destination endpoint. Lossless operation at low latency, multipath and support for priority-based scheduling thus result in a trend to implement familiar Layer 4 (L4) transmission control protocol (TCP) operations such as segmentation, resequencing, reassembly, flow control and retransmission in L2 "end-to-end" transport hardware, with associated TX and RX buffers at the L2 transport endpoints.

These buffers at the edges of an L2 interconnection network may accommodate hundreds of simultaneous flows from different traffic sources competing for bandwidth. Concerned mostly with "connections" and resource arbitration among L2 transport endpoints, the L2 transport described above can differentiate traffic into priority groups or virtual lanes at the L2 transport "endpoints", but is unaware of distinct traffic sources in hosts, operating systems (OSes) and guest OSes, as well as in different upper-layer protocols. As a result, one traffic source can easily "hog" an L2 TX and/or RX buffer, leading to an unfair and latency-increasing buffer usage. Moreover, multiple traffic sources may jointly overwhelm an L2 transport endpoint.

To avoid head-of-line blocking and saturation trees, lossless CEE operation requires a distributed congestion management (CM) according to 802.1Qau (QCN) with congestion detection at so-called Congestion Points (CPs), the formation of Congestion Notification Messages (CNMs) sent to traffic sources, and rate limitation at the traffic sources in so-called Reaction Points (RPs). Such CM may be implemented in Converged Network Adapters (CNAs) and in CEE switches.

Considering an L2 end-to-end transport, the associated TX buffers 24 and RX buffers 26 at the transport endpoints accumulate or integrate traffic from many sources 28. In networks with low probability of packet error, a TX buffer 24 containing many unsent or unacknowledged frames (in relation to the RTT*bandwidth product) indicates delay spread and/or congestion in the network. Likewise, an RX buffer 26 containing many partially reassembled frames or fully reassembled but undelivered frames indicates delay spread and/or congestion in the network. As a result, system 10 reuses the TX buffers 24 and RX buffers 26 of an L2 transport for congestion detection and for triggering the generation of CNMs, which results in a Proportional Derivative (PD) controller 12 compatible with IEEE 802.1Qau, resolves distinct traffic sources in the CNM feedback messages and leads to a fair usage of shared TX and RX buffer resources at L2 transport endpoints via smooth traffic source rate adjustments as opposed to on/off operation. In other words, double use of an L2 TX buffer 24 for transport operations (staging, segmentation, retransmission) and for QCN-based congestion detection, and/or double use of an L2 RX buffer 26 for transport operations (resequencing, reassembly, forwarding) and for QCN-based congestion detection.

Figure 8:
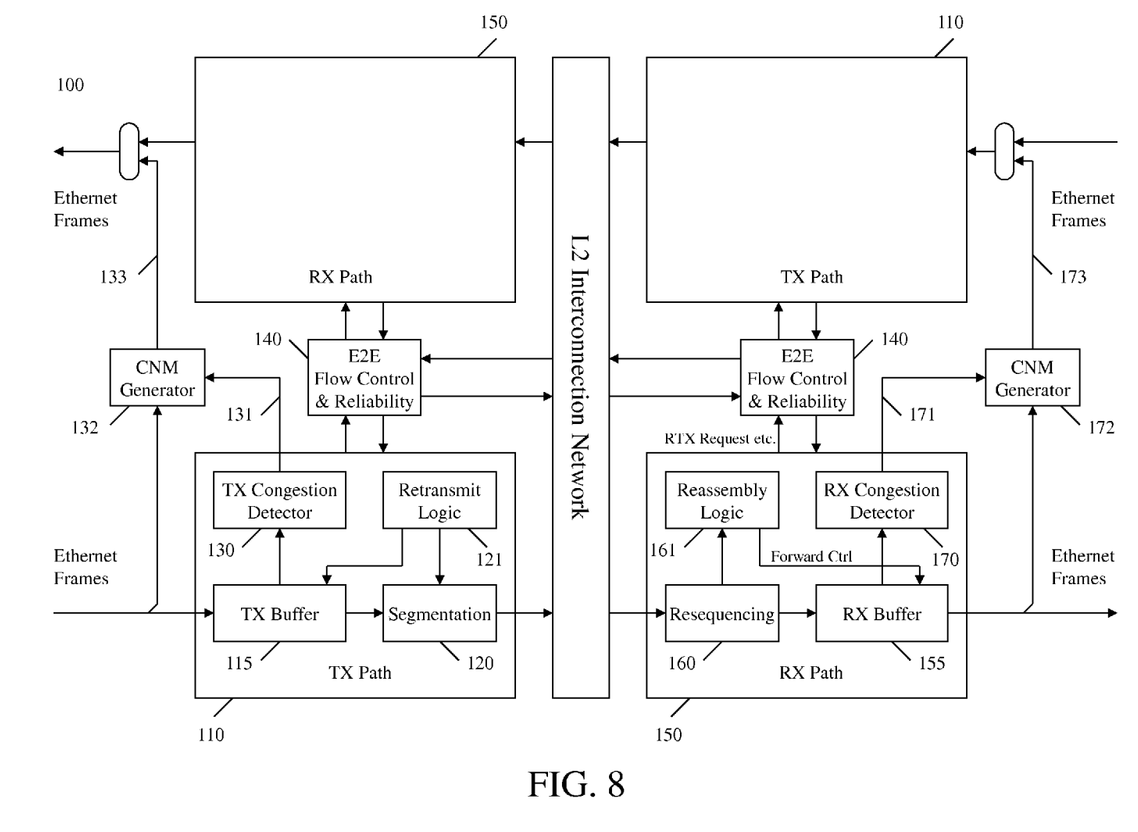
FIG. 8 is a block diagram illustrating an alternative Converged Enhanced network in accordance with the invention.

One possible embodiment is shown in FIG. 8 in which a TX Congestion Detector 130 measures buffer occupancy in TX Buffer 115, as well as the speed of change of buffer occupancy and computes a quantized feedback value fbq (131) by sampling the arriving traffic at a selected rate. The buffer occupancy can be measured on a per-priority-group or pervirtual-lane basis. The generation of fbq arms the CNM generation unit 132, which results in the sending of a CNM towards the traffic source.

Likewise, an RX Congestion Detector 170 measures buffer occupancy in RX Buffer 155, as well as the speed of change of buffer occupancy and computes a quantized feedback value fbq (171) by sampling the arriving traffic at a selected rate. The buffer occupancy can be measured on a per-priority-group or per-virtual-lane basis. The generation of fbq arms the CNM generation unit 172, which results in the sending of a CNM 173 towards the traffic source.

In one embodiment, system 10 determines congestion in a TX buffers 24 and RX buffers 26 of a layer 2 Ethernet connection, where the buffer comprises data flow from a number of sources 28. In another embodiment, the system 10 also determines congestion in an endpoint TX buffer 24 through buffer occupancy and rate of change in buffer occupancy.

In one embodiment, the system 10 also determines congestion in an endpoint RX buffer 26 through buffer occupancy and rate of change in buffer occupancy. In another embodiment, the system 10 also sends congestion notification messages (CNM) to the source 22 that produced the congestion.

It should be noted that in some alternative implementations, the functions noted in a flowchart block may occur out of the order noted in the figures. For instance, two blocks shown in succession may, in fact, be executed substantially concurrently, or the blocks may sometimes be executed in the reverse order, depending upon the functionality involved because the flow diagrams depicted herein are just examples. There may be many variations to these diagrams or the steps (or operations) described therein without departing from the spirit of the invention. For example, the steps may be performed concurrently and/or in a different order, or steps may be added, deleted, and/or modified. All of these variations are considered a part of the claimed invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method comprising:
monitoring a layer 2 endpoint buffer by at least one of determining buffer data packet occupancy, and rate of change in the buffer data packet occupancy, via a manager executing on a controller in a Converged Enhanced Ethernet network that includes a computer processor;
using at the manager at least one of unsent frames and unacknowledged frames, in relation to the round-trip-time*bandwidth product at a layer 2 transmitter buffer that is part of the layer 2 endpoint buffer as an indication of at least one of delay spread and congestion in the Converged Enhanced Ethernet network; and
notifying through a reporter a congestion source of the layer 2 endpoint buffer based upon the at least one of buffer data packet occupancy and rate of change in the buffer data packet occupancy.

2. The method of claim 1 further comprising:
providing at least one of frame segmentation and frame retransmission through the layer 2 endpoint buffer.

3. The method of claim 1 further comprising:
considering at least one of un-transmitted data packets, unordered data packets, and data unacknowledged packets with the buffer data packet occupancy.

4. The method of claim 1 further comprising:
sending congestion notification to the congestion source through the reporter.

5. The method of claim 1 further comprising:
using at least one of many partially reassembled frames, and fully reassembled but undelivered frames, at the layer 2 receiver buffer that is part of the layer 2 endpoint buffer as an indication of at least one of delay spread and congestion in the Converged Enhanced Ethernet network.

* * * * *